(12) United States Patent
Bajpai (10) Patent No.: US 12,052,283 B1
(45) Date of Patent: Jul. 30, 2024

(54) METHOD AND SYSTEM FOR SECURING ACCESS TO USER DATA DURING PHISHING DETECTION

(71) Applicant: Tanla Digital Labs Private Limited, Hyderabad (IN)

(72) Inventor: Sunil Bajpai, Hyderabad (IN)

(73) Assignee: Tanla Digital Labs Private Limited, Hyderabad (IN)

( * ) Notice: Subject to any disclaimer, the term of this patent is extended or adjusted under 35 U.S.C. 154(b) by 0 days.

(21) Appl. No.: 18/417,915

(22) Filed: Jan. 19, 2024

(30) Foreign Application Priority Data

Jan. 21, 2023 (IN) .............................. 202341004295

(51) Int. Cl.
*H04L 9/40* (2022.01)
(52) U.S. Cl.
CPC ...... *H04L 63/1483* (2013.01); *H04L 63/1416* (2013.01)
(58) Field of Classification Search
USPC .......................................................... 726/23
See application file for complete search history.

(56) References Cited

U.S. PATENT DOCUMENTS

| | | | |
|---|---|---|---|
| 10,917,368 B2* | 2/2021 | Lee | H04L 51/046 |
| 2011/0086610 A1* | 4/2011 | Baldwin | H04M 15/47 455/405 |
| 2011/0185426 A1* | 7/2011 | Zuk | H04L 63/1425 726/23 |
| 2012/0028606 A1* | 2/2012 | Bobotek | H04L 51/212 455/411 |
| 2016/0112369 A1* | 4/2016 | Boodaei | H04L 63/12 455/414.1 |
| 2017/0078311 A1* | 3/2017 | Clark | H04L 63/1425 |
| 2017/0262773 A1* | 9/2017 | Swaminathan | G06N 20/00 |
| 2017/0346851 A1* | 11/2017 | Drake | H04L 9/0838 |
| 2018/0139223 A1* | 5/2018 | Yan | G06F 21/552 |
| 2019/0173913 A1* | 6/2019 | Kras | H04L 63/1483 |
| 2020/0192865 A1* | 6/2020 | Eads | G06F 16/2471 |

* cited by examiner

Primary Examiner — Sakinah White Taylor
(74) Attorney, Agent, or Firm — HSML P.C.

(57) ABSTRACT

Disclosed herein is a method, system and non-transitory computer-readable medium for securing access to user data during detection of phishing attacks in Short Message Service (SMS) communications. The method includes detecting phishing text messages directed to one or more users associated with a first server, and transmitting a Call Data Record (CDR) for the one or more phishing text messages and obtaining access tokens for the CDRs of the one or more phishing text messages from the second server. Furthermore, the method includes transmitting text and hashed tokens of CDRs of the one or more phishing text messages to the first server for investigation, and receiving a CDR access request for accessing CDRS of a selected one or more phishing text messages from the first server and transmitting the CDR access tokens of the selected one or more phishing text messages to the first server to access the CDRs.

15 Claims, 6 Drawing Sheets

| Mobile Numbers 352 | Hashed Mobile Numbers 252 | Random Secret Values 354 | Verification Values 262 | Security Flags 264 |
|---|---|---|---|---|
| MN1 | zzzzz | 123 | fffff | Yes |
| MN2 | kkkkk | 124 | eeeee | No |
| MN3 | ppppp | 125 | aaaaa | No |
| MN4 | yyyyy | 126 | ggggg | Yes |

METHOD AND SYSTEM FOR SECURING ACCESS TO USER DATA DURING PHISHING DETECTION

CROSS REFERENCE TO RELATED APPLICATION

This application claims the benefit of priority to Indian Provisional Patent Application Number 202341004295, filed on Jan. 21, 2023, the entire contents of which are hereby incorporated by reference.

FIELD OF THE DISCLOSURE

The present disclosure, in general, relates to phishing detection and more particularly, to a method and system for securing access to user data during detection of phishing attacks in Short Message Service (SMS) communications.

BACKGROUND

Phishing attacks have been escalating day by day where attackers deceive people into revealing sensitive information or installing malware such as ransomware. Phishing has become the most common type of cybercrime, with many cybercrime regulatory bodies reporting more incidents of phishing than any other type of cybercrimes. Smishing is a type of phishing that includes attackers sending various types of Short Messaging Services (SMS) or text messages, which may contain links to open unsecured websites, to users and prompting the users for login credentials. Smishing generally targets mobile phone users, enticing them with exciting job offers, holiday offers or lottery prizes, which eventually results in the users revealing confidential information such as usernames, passwords, credit card or debit card details etc.

Further, some phishing attacks, may impersonate a number of entities, such as financial institutions, social media networks, medical and health organizations, to deceive mobile phone users in revealing sensitive information. Hence, the entities may wish to address the phishing attacks faced by their customers or any other mobile users who may be victims of such attacks. However, to prevent such smishing attacks, the entities may need to share the customers' private information like mobile numbers with any anti-smishing platform. However, this may lead to breach of privacy of the customers' information without their knowledge. Further, it is practically impossible for any telecommunication operator to provide access to all Call Data Records (CDRs) of all customers to keep a track on the smishing menace.

Furthermore, the entities also are in a desperate need to spot phishing attacks that are particularly impersonating the entities to collect sensitive information from people, which in turn affect the reputation of the entities.

Hence, there exists a need for a system and a method to provide a secure communication protocol to enable exchange of confidential information between the entity which wants to protect its customers from smishing, an anti-smishing platform and a telecommunication operator. Further, there is also a need for a mechanism to request access to call data records of only smishing messages that are of interest and importance to the entity.

The information disclosed in this background of the disclosure section is only for enhancement of understanding of the general background of the disclosure and should not be taken as acknowledgment or any form of suggestion that this information forms prior art already known to a person skilled in the art.

SUMMARY

Disclosed herein is a method for securing access to user data during detection of phishing attacks in Short Message Service (SMS) communications performed by a privacy preservation system. The method comprises detecting one or more phishing text messages directed to one or more hashed mobile numbers listed by the first server or an enterprise server as being of interest. Further, the method comprises transmitting a Call Data Record (CDR) for each of the one or more phishing text messages to a second server and obtaining a token for the CDR of each of the one or more phishing text messages from the second server. Furthermore, the method comprises transmitting text and a hashed token of CDR of each of the one or more phishing text messages to the first server for investigation of the text. Thereafter, the method comprises receiving a request to access the CDR associated with each of a selected one or more phishing text messages from the first server. The request comprises the hashed tokens of the selected one or more phishing text messages. Subsequently, the method comprises transmitting the token of the CDR of each of the selected one or more phishing text messages to the first server to access the CDR of each of the selected one or more phishing text messages, upon successful verification of the request.

Disclosed herein is a privacy preservation system for securing access to user data during detection of phishing attacks in Short Message Service (SMS) communications, the system comprising a memory and a processor coupled with the memory. The processor is configured to detect one or more phishing text messages directed to one or more hashed mobile numbers associated with a first server or an enterprise server. Further, the processor is configured to transmit a Call Data Record (CDR) for each of the one or more phishing text messages and obtain a token for the CDR of each of the one or more phishing text messages from a second server. Furthermore, the processor is configured to transmit text and a hashed token of CDR of each of the one or more phishing text messages to the first server for investigation of the text. Thereafter, the processor is configured to receive a request to access the CDR associated with each of a selected one or more phishing text messages from the first server. The request comprises the hashed tokens of the selected one or more phishing text messages. Subsequently, the processor is configured to transmit the token of the CDR of each of the selected one or more phishing text messages to the first server to access the CDR of each of the selected one or more phishing text messages, upon successful verification of the request.

Discloses herein is a non-transitory computer-readable medium having program instructions stored thereon, when executed by a privacy preservation system, facilitate the privacy preservation system to secure access to user data during detection of phishing attacks in Short Message Service (SMS) communications by operations. The operations comprising detecting one or more phishing text messages directed to one or more hashed mobile numbers associated with a first server and transmitting a Call Data Record (CDR) of each of the one or more phishing text messages to a second server. The operations further comprising obtaining an access token for the CDR of each of the one or more phishing text messages from the second server and transmitting text and a hashed token of CDR of each of the one or more phishing text messages to the first server for investigation of the text. The operations also comprise receiving a request to access the CDR associated with each of a selected one or more phishing text messages from the first server. The request comprises the hashed tokens of the selected one or more phishing text messages. The operations further comprise transmitting the access token of the CDR of each of the selected one or more phishing text messages to the first server to access the CDR of each of the selected one or more phishing text messages, upon successful verification of the request.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and system for securing access to user data during detection of phishing attacks in SMS communications. The system comprises a first server, of an enterprise, that is configured to secure its users or any stakeholders from receiving any phishing SMS from a phishing sender. The system comprises a Privacy Preservation System (PPS), in communication with the enterprise server, configured to detect any phishing text messages directed or addressed to users of the enterprise. The system also comprises a second server, such as a telecommunication server, in communication with the PPS, that provides access tokens to Call Data Records (CDRs) of any messages to the privacy preservation system. Upon detecting the phishing text messages, the PPS transmits CDRs of the phishing text messages and obtains CDR access tokens from the second server to access CDRs of the phishing text messages.

Further, the PPS also transmits text content of the phishing text messages to the first server, which enables the first server to perform investigation and select one or more phishing text messages of interest such as phishing text messages impersonating the enterprise. The first server sends requests to the PPS to access one or more CDRs of the selected phishing text messages. The privacy preservation system transmits the CDR access tokens of the one or more CDRs to the first server. Further, the first server may further communicate with the second server to access the CDRs using the CDR access tokens and to take any action on senders of such phishing text messages such as deactivating the sender's mobile number or message header or blocking any such phishing text messages from sending to the users of the enterprise or blocking any messages from the senders.

Thus, the PPS enables an enterprise to secure users or any stakeholders associated with the enterprise from phishing attacks by securing users' private information. The PPS may provide CDR access tokens of one or more phishing messages directed to its users thereby enabling the first server to securely access the CDRs from the second server. Further, the first server may directly communicate with the second server to block the one or more smishing messages directed to its users to curb the smishing attacks. Further, the PPS also facilitates the first server to identify information, about phishing attacks particularly impersonating the enterprise, senders, location of the senders, types of the phishing messages by providing access to the CDR access tokens. The enterprise may further communicate with the second server to block the phishing message or block the sender that may further aid in mitigating such phishing attack.

Figure 1:
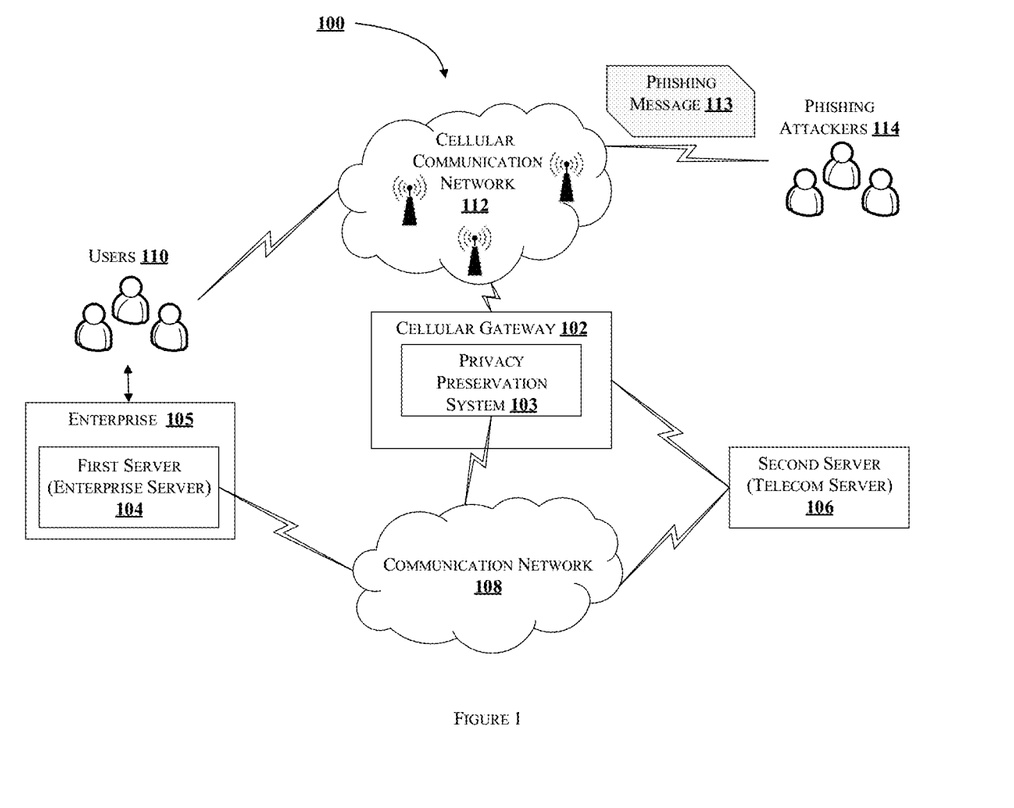
FIG. 1 illustrates an exemplary architecture of a proposed system implementing a privacy preservation protocol to secure access to user data during detection of phishing attacks in Short Message Service (SMS) communications in accordance with an embodiment of the present disclosure.

FIG. 1 illustrates an exemplary architecture of a proposed system implementing a privacy preservation protocol to secure access to user data during detection of phishing attacks in Short Message Service (SMS) communications in accordance with an embodiment of the present disclosure.

As shown in FIG. 1, the exemplary architecture 100 comprises one or more components configured to perform a method of securing access to user data during detection of phishing attacks in Short Message Service (SMS) communications. In one embodiment, the architecture 100 comprises a cellular gateway 102 configured with a Privacy Preservation System (PPS) 103, a first server 104, for example, an enterprise server 104 associated with an enterprise 105 and a second server 106, for example, a telecommunication server 106 communicatively coupled via a communication network 108. In an embodiment, the first server 104 may be any server other than the enterprise server, which may be configured to send one or more SMS communications to users of an enterprise and to secure the users by avoiding any phishing attacks, for example, phishing attacks impersonating the enterprise 105, deceiving the customers to involve in fraudulent transactions. Similarly, the second server 106 may be any server other than the telecommunication server, that is capable of transmitting SMS communications to users and providing access to CDRs of one or more phishing text messages.

The first server 104 may be any computing device associated with the enterprise 105 configured to store user data of one or more users 110 registered with the enterprise 105. The enterprise 105 may be any entity, or any institution that provides one or more services to the registered one or more users 110 for example, providing banking or consulting services to the one or more users 110 and secure the one or more users 110 from phishing attacks, for example, smishing attacks during the services via the first server 104.

The first server 104 is communicatively coupled with the PPS 103 that detects phishing attacks in SMS communications with the one or more users 110. In some embodiments, there may be a plurality of first servers 104 associated with the enterprise 105 and communicating with the PPS 103 to detect phishing attacks while securing the user data. The first server 104 may be configured to share information about the one or more users 110 of the enterprise 105 through the communication network 108 with the PPS 103 to detect phishing attacks on the one or more users 110. The first server 104 may receive information about one or more phishing text messages 113 from the PPS 103 targeted to the one or more users 110. The first server 104 may also be configured to communicate with the telecom sever 106 and access one or more Call Data Records (CDRs) of the one or more phishing text messages 113 targeted to the one or more users 110 from the second server 106.

The second server 106 may be a server associated with a telecommunication operator, configured to receive text messages of the users from the cellular network 112 via the cellular gateway 102. The PPS 103 in the cellular gateway 102 detects phishing of the received text messages and generate alerts to the second server 106 indicating about the phishing text messages. Upon receiving the alerts, the second server 106 may provide tokens to the PPS 103 to access CDRs of phishing text messages 113 that was generated by the second server 106. In another embodiment, the second server 106 may also be configured to provide access to one or more CDRs to the first server 104 in response to receiving the tokens from the first server 104 via the communication network 108.

The communication network 108 may include, without limitation, a direct interconnection, a Local Area Network (LAN), a WAN (Wide Area Network), wireless network, point-to-point network, or another configuration. One of the most common types of networks in current use is a Transfer Control Protocol and Internet Protocol (TCP/IP) network for communication between a database client and a database server. Other common internet protocols used for such communication include, without limiting to, Hyper Text Transfer Protocol Secure (HTTPS), File Transfer Protocol (FTP), Wireless Application Protocol (WAP) and other secure communication protocols. The communication network 108 may be communicatively coupled to the cellular communication network 112 via the cellular gateway 102.

The cellular communication network 112 is a mobile communication network that provides wireless communication for voice, data and SMS communication services to mobile devices of users. The cellular communication network 112 may be any of a $2^{nd}$ Generation (2G), $3^{rd}$ Generation (3G), GSM, CDMA, GPRS, $4^{th}$ Generation (4G), Long Term Evolution (LTE), Voice over LTE (VoLTE), $5^{th}$ Generation (5G) or other networks. The cellular communication network 112 provides communication services to users via the cellular gateway 102.

The cellular gateway 102 may be a mobile telephone switching office, a Mobile Switching Center (MSC) or any other gateway that is configured to receive a plurality of messages from a plurality of senders and route them to a plurality of intended recipients. In particular, the cellular gateway 102 may be an MSC associated with the one or more users 110, wherein the cellular gateway 102 receives one or more text messages directed to the one or more users 110 from a plurality of senders and routes the one or more text messages to the one or more users 110. The cellular gateway 102 may also be configured to generate Call Data Records (CDRs) of the one or more text messages received at the cellular gateway 102. The CDR may comprise information about a sender including a sender identifier such as a sender mobile number or a sender header, a time at which the text message was sent, a location of the sender, a base station associated with the sender, a recipient identifier such as a recipient's mobile number, a base station associated with the recipient and a location of the recipient, a time at which the text message was received at the cellular gateway 102. The PPS 103 is configured within the cellular gateway 102 to monitor messages received at the cellular gateway 102 from a number of senders (not shown) and detect if any message corresponds to a phishing text message. The PPS 103 is configured to secure one or more users 110 of the enterprise 105 from phishing attacks that may occur via a cellular communication network 112, particularly the SMS communications.

In operation, the one or more components of the architecture 100 communicate with each other to perform the method of securing access to user data during detection of phishing attacks in Short Message Service (SMS) communications. Firstly, the first server 104 may transmit a hashed list of Mobile Station International Subscriber Directory Numbers (MSISDNs) (also referred to as mobile numbers) to the PPS 103. The hashed list of mobile numbers may comprise a first plurality of mobile numbers to be secured and a second plurality of mobile numbers that need not be secured. The first plurality of mobile numbers may be associated with a first plurality of users 110, also referred as users of interest 110. The users of interest 110 are the users, such as, but not limited to, customers of a bank, where the enterprise 105, such as, but not limited to, the bank, secures from phishing. The second plurality of mobile numbers may be unrelated to the enterprise 105. In an embodiment, the second plurality of mobile numbers may be generated using a predefined mobile number scheme, such as a previous number of a customer's mobile number and a next number of the customer's mobile number. In this embodiment, the second plurality of mobile numbers may or may not be associated with any user. Further, the first server 104 also shares the first plurality of mobile numbers and the second plurality of mobile numbers to secure data privacy of the users of interest 110. The hashed list of mobile numbers may comprise hashed values of the mobile numbers in a random order, so that the PPS 103 may not be able to identify or distinguish between the first plurality of mobile numbers and the second plurality of mobile numbers. The first server 104 may also transmit authentication data, to the PPS 103, that may be later used by the PPS 103 to authenticate one or more requests for CDRs sent by the first server 104.

Further, the PPS 103 may receive the hashed list of mobile numbers and authentication data from the first server 104 and monitor one or more text messages directed to the mobile numbers. The PPS 103 may process the one or more text messages and detect if any of the one or more text messages is a phishing text message. If the PPS 103 detects that a phishing text message 113 is being directed to any of the mobile numbers, the PPS 103 may generate the CDR of the phishing text message 113. The CDR may comprise, but not limited to, a sender mobile number, a recipient mobile number, a sent time of the message, a telecom operator associated with the sender, a telecom operator associated with the recipient and a text content of the phishing text message 113. In some embodiments, the CDR may comprise an encrypted version of the text content, encrypted using a public key of the second server 106. Further, the PPS 103 may transmit the generated CDR to the second server 106.

The PPS 103 may obtain an access tokens from the second server 106 to access the CDR of the phishing text message 113. Further, the PPS 103 may transmit text of the phishing text message 113 to the first server 104 and receive a request to access the CDR of the phishing text message 113 from the first server 104 if the enterprise 105 is interested in further investigating the phishing text message 113. Further, the PPS 103 may provide the CDR access tokens to the first server 104 in response to the request. The first server 104 may receive the CDR access tokens and communicate with the second server 106 to access the CDRs of the phishing text messages 113 using the CDR access tokens. In an embodiment, the PPS 103, the first server 104 and the second server 106 may also communicate through a distributed ledger (not shown in figures).

Figure 2A:
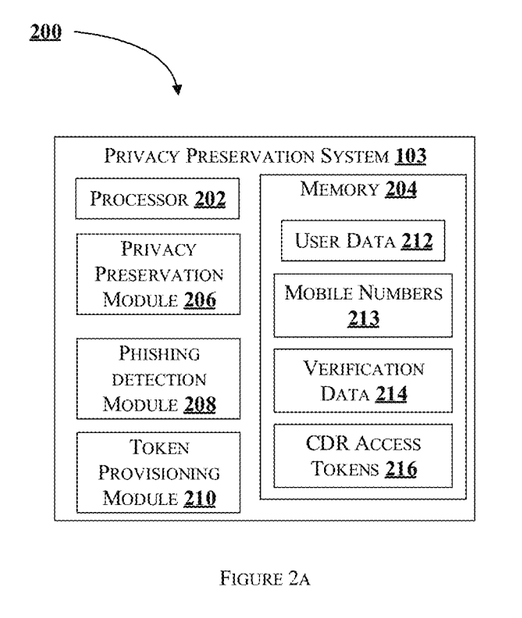
FIG. 2a illustrates an exemplary block diagram of a Privacy Preservation System (PPS) to secure access to user data during detection of phishing attacks in Short Message Service (SMS) communications in accordance with an embodiment of the present disclosure.

FIG. 2a illustrates an exemplary block diagram of the PPS 103 to secure access to user data during detection of phishing attacks in Short Message Service (SMS) communications in accordance with an embodiment of the present disclosure.

As shown in FIG. 2a, the privacy preservation system 103 may be any computing device configured within the cellular gateway 102, capable of detecting phishing attacks directed to one or more mobile numbers in SMS communications. In one embodiment, the privacy preservation system 103 comprises a processor 202, a memory 204, a privacy preservation module 206, a phishing detection module 208, a token provisioning module 210 and other modules (not shown in FIG. 2a). In some embodiments, the privacy preservation module 206, the phishing detection module 208, the token provisioning module 210 and other modules may be configured within the processor 202. The memory 204 stores user data 212, mobile numbers 213, verification data 214 and CDR access tokens 216.

The privacy preservation module 206 is configured to secure access to the user data 212 during detection of phishing attacks in SMS communications. The privacy preservation module 206 receives the user data 212 of one or more mobile numbers from the first server 104. The user data 212 may include data of the users of interest 110, for whom the enterprise 105 provides security from phishing. The user data 212 may also include the second plurality of mobile numbers, which are un-related to the enterprise 105. However, the privacy preservation module 206 may not be configured to distinguish between the first plurality of mobile numbers and the second plurality of mobile numbers based on the user data 212 as the data may be randomly ordered and the information about the identities of the users of interest 110 may not be shared by the first server 104 to the privacy preservation module 206. This helps in preserving privacy of the data of the users of interest 110.

Figure 2B:
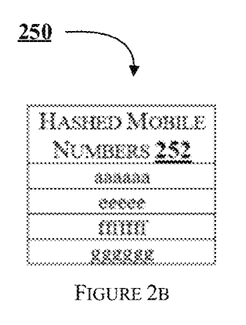
FIGS. 2b and 2c illustrate examples of data received by the PPS to secure access to user data during detection of phishing attacks in SMS communications in accordance with an embodiment of the present disclosure.
Figure 2C:
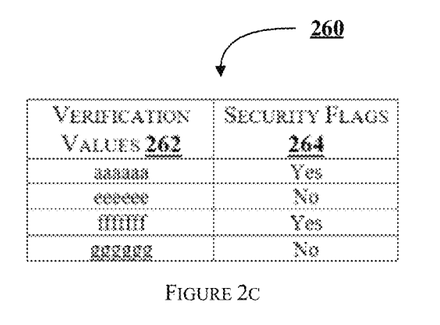

As shown in FIG. 2b and FIG. 2c respectively, in one embodiment, the privacy preservation module 206 receives two datasets, for example, a first dataset 250 and a second dataset 260, from the first server 104. The first dataset 250 comprises hashes of a plurality of mobile numbers 252, including hashes of the first plurality of mobile numbers of the users of interest 110 and hashes of the second plurality of mobile numbers. An example first dataset 250 is shown in FIG. 2b, wherein the hashes of the mobile numbers 252 are ordered in an alphabetical or an alphanumeric order. The second dataset 260 comprises verification values 262 and corresponding security flags 264. The verification values 262 are used later as authentication data to verify one or more requests to access CDRs, received from the first server 104. The security flags 264 indicate whether a mobile number requires security or not from phishing. For example, if the security flags 264 indicate a 'Yes' for a specific mobile number, then the mobile number requires security from phishing. Similarly, if the security flags 264 indicate a 'No', then the mobile number does not require security from phishing. However, as the first dataset 250 and the second dataset 260 are received separately from the first server 104, the PPS 103 may not be able to map the verification values 262 and corresponding security flags 264 of the second dataset 260 to a hashed mobile number 252 of the first dataset 250 to determine which hashed mobile number requires security or not. Thus, the security of the user data is ensured even though the mobile numbers of the users are accessible to the PPS 103.

The privacy preservation module 206 further stores the first dataset 250 as a plurality of mobile numbers 213 and the second dataset 260 as verification data 214 in the memory 204. The privacy preservation module 206 hashes each of the hashed mobile numbers again to decrypt actual mobile numbers 213 in order to detect any phishing attacks on the plurality of mobile numbers 213. At this instance, even though the privacy preservation module 206 has access to the plurality of mobile numbers 213, the privacy preservation module 206 may not be able to trace which mobile number corresponds to users of interest. This is because the privacy preservation module 206 is not aware of which mobile numbers among the first dataset 252 require security and which mobile numbers do not require security from phishing attacks. In one embodiment, the first server 104 hashes the plurality of mobile numbers using a hash function known to the first server 104 and the privacy preservation system 102. Thus, the privacy preservation module 206 stores the plurality of mobile numbers 213 to enable phishing detection module 208 to detect any phishing attacks directed to the plurality of mobile numbers 213.

The phishing detection module 208 retrieves the plurality of mobile numbers 213, monitors one or more text messages directed to the plurality of mobile numbers 213 and detects if the one or more text messages are phishing text messages 113. The phishing detection module 208 may have access to one or more text messages directed to the plurality of mobile numbers 213 via the cellular gateway 102. The phishing detection module 208 may receive the one or more text messages directed to the plurality of mobile numbers 213 and may process the one or more text messages. The processing comprises extracting a message pattern, one or more Calls To Action (CTAs) and a sender identifier of a sender of each of the one or more text messages.

The phishing detection module 208 may compare the text message pattern of a text message with a plurality of blacklist message patterns and a plurality of whitelist message patterns stored in a database and may classify if the text message pattern is 'good', 'bad' or 'unknown' based on the comparison. The phishing detection module 208 may compare the one or more CTAs of the text message with a plurality of blacklist CTAs and a plurality of whitelist CTAs stored in a database and may classify the one or more CTAs as 'good', 'bad' or 'unknown' based on the comparison. The phishing detection module 208 may compare the sender identifier of the sender of the text message with a plurality of blacklist sender identifiers and a plurality of whitelist sender identifiers stored in a database and may classify the sender identifier as 'good', 'bad' or 'unknown' based on the comparison. In one embodiment, the phishing detection module 208 may compute a sender reputation score for each sender and may classify the text message as 'good', 'bad' and 'unknown' based on the sender reputation score. The phishing detection module 208 may detect if the text message is 'phishing' or 'genuine' based on the classifications of the text message pattern, the sender and the one or more CTAs embedded in the text message. Based on the above classifications, the phishing detection module 208 may detect one or more phishing text messages 113 among the one or more text messages directed to the plurality of mobile numbers 213.

The token provisioning module 210 generates a CDR of each of the one or more phishing text messages 113. The CDR may comprise data associated with each of the one or more phishing text messages 113 such as, but not limited to, a sender mobile number, a recipient mobile number, a timestamp of the message, a telecom operator associated with the sender, a telecom operator associated with the recipient and a text content. Further, the PPS 103 may encrypt the CDR of each of the one or more phishing text messages 113, using a public key of the second server 106. The token provisioning module 210 transmits the encrypted CDR to the second server 106 and receives a CDR access token 216 as an acknowledgement for each of the one or more phishing text messages 113 from the second server 106. The CDR access token 216 may be used to access the CDR of each of the one or more phishing text messages 113 from the second server 106. The token provisioning module 210 transmits a hash of the CDR access token 216 and the text of each of the one or more phishing text messages 113 to the first server 104 for investigation. The token provisioning module 210 receives a request to access the CDR associated with a number of selected one or more phishing text messages 113, that are selected by the first server 104 upon investigation. In one example, the first server 104 may select 50 messages from a total of 100 phishing text messages. The request comprises the hashed CDR access tokens (alternatively referred herein as hashed tokens), for each of the selected one or more phishing text messages 113.

The token provisioning module 210 transmits one or more hashed mobile numbers 252, stored in the plurality of mobile numbers 213, associated with the selected one or more phishing text messages 113 to the first server 104 for verification of the request. The token provisioning module 210 receives at least a verification value and a security flag associated with each of the selected one or more phishing text messages 113 when the one or more hashed mobile numbers 252 belong to the users of interest. In one embodiment, the token provisioning module 210 receives at least a verification value and a security flag associated with only a few hashed mobile numbers, for example, 20 hashed mobile numbers of the one or more hashed mobile numbers 252, when only the few of the one or more hashed mobile numbers 252 belong to the users of interest. The token provisioning module 210 verifies if the received verification values and the security flags match with any of the verification values 262 and the security flags 264 stored in the verification data 214. The token provisioning module 210 may transmit the CDR access token for each of the selected one or more phishing text messages 113 to the first server 104 upon successful verification of the request.

Thus, the PPS 103 secures access to personal or sensitive information of the one or more users 110 during detection of phishing attacks in SMS communications. Further, the PPS 103 also enables the first server 104 to access CDRs of the selected one or more phishing detection messages easily and securely from the second server 106, which otherwise is a complex, time consuming and insecure process in general.

Figure 3A:
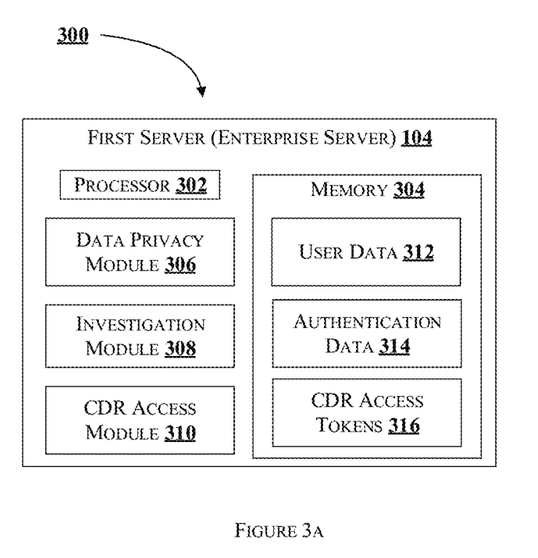
FIG. 3a illustrates an exemplary block diagram of a first server of the proposed system of FIG. 1 in accordance with an embodiment of the present disclosure.

FIG. 3a illustrates an exemplary block diagram of the first server 104 in accordance with an embodiment of the present disclosure.

As shown in FIG. 3a, the first server 104 may be any computing device capable of storing, managing and processing information related to the one or more users 110 of the enterprise 105. In one embodiment, the first server 104 comprises a processor 302, a memory 304, a data privacy module 306, an investigation module 308, a CDR access module 310 and other modules (not shown in FIG. 3a). In some embodiments, the data privacy module 306, the investigation module 308, the CDR access module 310 and other modules may be configured within the processor 302.

The data privacy module 306 stores information of the one or more users 110 (alternatively referred to as users of interest) of the enterprise 105 as user data 312 in the memory 304. The information comprises the first plurality of mobile numbers of the users of interest 110 and the second plurality of mobile numbers. For example, the users of interest 110 may be one or more customers of a bank.

Figure 3B:
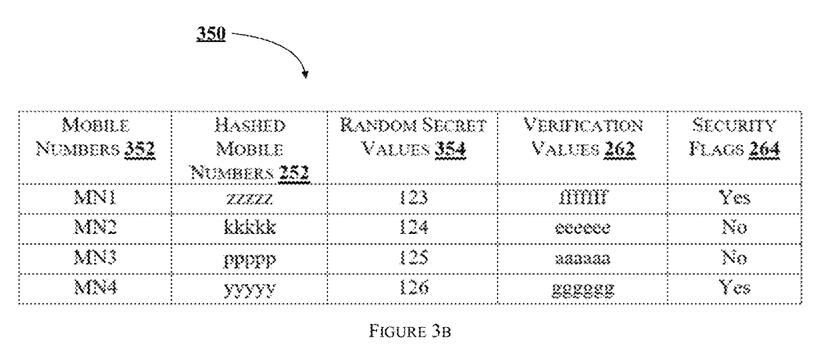
FIG. 3b illustrates examples of data generated by the first server of FIG. 3a in accordance with an embodiment of the present disclosure.

The data privacy module 306 may generate authentication data 314 comprising, but not limited to, a plurality of attributes, for example, the plurality of attributes 350 shown in FIG. 3b, for each of the first plurality of mobile numbers and the second plurality of mobile numbers. In one embodiment, a first attribute may be the mobile number 352, a second attribute may be the hashed mobile number 252, a third attribute may be a random secret value 354 generated based on the mobile number, a fourth attribute may be the verification value 262 which is a hash value computed between the hashed mobile number 252 and the random secret value 354, a fifth attribute may be the security flag 264 indicating whether the mobile number requires security from phishing or not. There may also be a sixth attribute (not shown) which is a signature authenticating the first attribute, the second attribute, the third attribute, the fourth attribute and the fifth attributes. The fifth attribute i.e., the security flag 264 may indicate a first value for the first plurality of mobile numbers, such as "Yes", or "1" thereby indicating that the mobile numbers need to be secured from phishing and a second value for the second plurality of mobile numbers, such as "No", or "0" indicating that the mobile numbers need not be secured from phishing. The plurality of attributes 350 may be stored in any form of data structure such as, but not limited to, a table. The hashes used in the second attribute and the fourth attribute may be any type of cryptographic hash function. In one embodiment, the hash used in the second attribute may be a common hash value agreed upon by the first server 104 as well as the PPS 103.

The data privacy module 306 may further transmit a part of the authentication data 314 to the PPS 103 in the form of two separate datasets, the first dataset 250 and the second dataset 260, to the PPS 103 for detecting any phishing attacks in the SMS communications associated to the users of interest. The first dataset 250 comprises the list of hashed values of the mobile numbers 252 comprising the first plurality of mobile numbers and the second plurality of mobile numbers. The second dataset 260 comprises the list of verification values 262 and the security flags 264.

The verification value 262 may be used by the PPS 103 for verifying a CDR access request received from the CDR access module 310. The data privacy module 306 may randomly include the second plurality of mobile numbers between the first plurality of mobile numbers of the users of interest to secure data of the users of interest, when transmitting data to the PPS 103. Thus, when PPS 103 receives the two datasets 250 and 260, the PPS 103 cannot differentiate the first plurality of mobile numbers of the users of interest 110 from the second plurality of mobile numbers in particular. Consequently, the PPS 103 detects any phishing attacks on the first plurality of mobile numbers, as well as the second plurality of mobile numbers.

The investigation module 308 receives, from the PPS 103, phishing data associated with one or more phishing text messages 113 detected by the PPS 103 and stores the phishing data in the memory 304. The phishing data comprises textual information associated with the one or more phishing text messages 113, for example 100 messages, and corresponding hashed tokens. The textual information comprises text of the phishing text message and the hashed token is a hash of a CDR access token provided by the PPS 103 to the first server 104 to access CDR of the phishing text message. The investigation module 308 may investigate the textual information of the one or more phishing text messages 113 and may select one or more phishing text messages 113 for which the first server 104 may require access to CDR.

The investigation may comprise processing of the textual information and may determine if the textual information impersonates the enterprise 105 in phishing attack. For example, the investigation module 308 processes the text of a phishing text message and finds words such as debit, credit, bank, account etc., which are impersonating the bank 105 and may select the phishing text message for accessing the CDR. In another example, the investigation module 308 processes the text of a phishing text message and finds words such as delivery, OTP, package etc., which do not relate to the bank 105. In this scenario, the investigation module 308 may not select the text message as the phishing text message, and hence, there is no requirement for accessing the CDR. Thus, the investigation module 308 selects only those text messages among the one or more phishing text messages 113, for example 50 of 100 phishing text messages, which are impersonating the enterprise 105, such as bank, for launching a phishing attack.

The CDR access module 310 may transmit a request (also referred herein as a CDR access request) to access the CDRs of the selected one or more phishing text messages 113 (i.e., in the above example 50 messages) to the PPS 103. The CDR access request comprises the one or more hashed tokens corresponding to the selected one or more phishing text messages 113. In response to the CDR access request, the CDR access module 310 may receive one or more hashed mobile numbers 252 associated with the selected one or more phishing text messages 113 from the PPS 103. In the above example, CDR access module 310 receives 50 hashed mobile numbers corresponding to 50 selected phishing text messages. The CDR access module 310 may determine if each of the received one or more hashed mobile numbers 252 is one of the first plurality of mobile numbers and the second plurality of mobile numbers.

The CDR access module 310 may identify only a few of the one or more hashed mobile numbers 252, for example, 20 hashed mobile numbers of the 50 hashed mobile numbers, that are associated with the users of interest, from the received one or more hashed mobile numbers. Thus, the CDR access module 310 identifies only the mobile numbers, for example 20 mobile numbers of the users of interest, such as customers, associated with the enterprise 105, such as a bank, and filters out other the mobile numbers, for example 30 mobile numbers, that do not belong to the users of interest 110.

The CDR access module 310 transmits, via the communication network 108, the plurality of attributes 350 associated with each of the identified hashed mobile numbers, for example, 20 mobile numbers, to the PPS 103. The CDR access module 310 further receives a CDR access token 316 for each of the phishing text messages 113, for example 20 CDR access tokens, associated with the identified mobile numbers, in the above example of 20 mobile numbers, upon successful verification of the received attributes by the PPS 103. In one embodiment, the successful verification comprises determining whether the verification value 262 and the security flag 264 of each of the identified mobile numbers match with the corresponding verification value 262 and the security flag 264 of the second dataset 260, stored in the PPS 103. The CDR access module 310 uses the CDR access tokens 316 of the phishing text messages 113 associated with the filtered few of the hashed mobile numbers to the second server 106 to access CDRs of the phishing text messages 113. The CDR access module 310 receives the CDRs of the phishing text messages 113 associated with the phishing text messages 113 from the second server 106.

The first server 104 communicates with the PPS 103 for detecting phishing attacks on the users of the enterprise 105 and accesses CDRs of the phishing text messages 113 from the second server 106. Further, the first server 104 may utilize the CDRs to extract information about one or more senders, time stamps of the phishing text messages 113 etc., to mitigate such phishing attacks. The first server 104 may alert the identified hashed mobile numbers among the users of interest by sending alert notifications about the phishing attacks on the users. The alert notifications may include information about the detected phishing text message, the sender information and a message from the enterprise 105 indicating that the sender is a phishing attacker 114, thereby preventing the users from opening or responding to any message from such senders. In another embodiment, the first server 104 may also send the alert notifications of the detected phishing text messages 113 to the users of interest, alerting the users against the phishing attack and type of the phishing attack. Further, the first server 104 may also communicate with the second server 106 to disable the mobile number of the phishing attacker 114.

Figure 4:
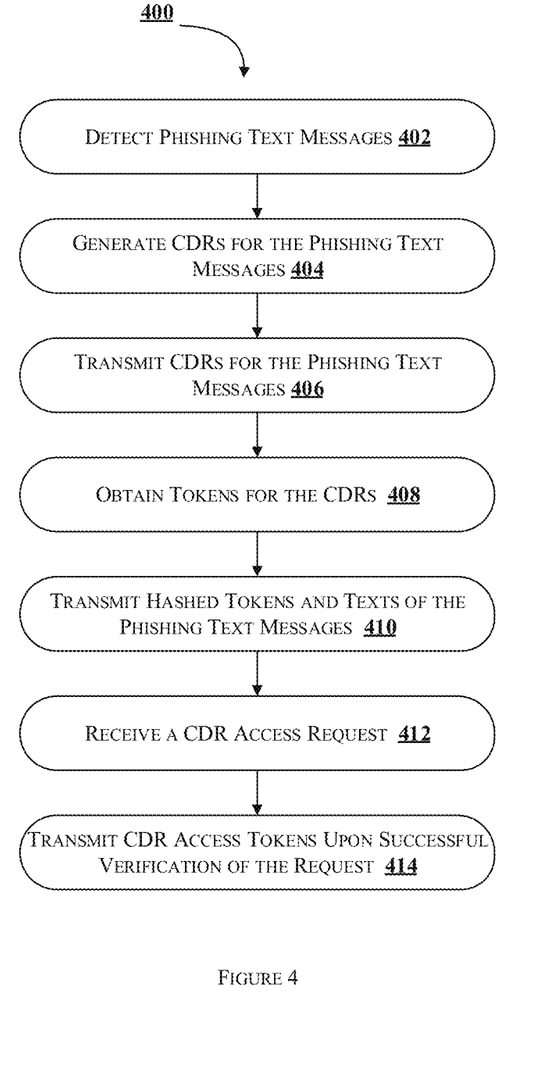
FIG. 4 illustrates a flowchart showing the steps involved in a method of securing access to user data during detection of phishing attacks in Short Message Service (SMS) communications in accordance with an embodiment of the present disclosure.

FIG. 4 illustrates flowchart showing the steps involved in a method of securing access to user data during detection of phishing attacks in Short Message Service (SMS) communications in accordance with an embodiment of the present disclosure.

The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 402, the PPS 103 may detect one or more phishing text messages 113 directed to one or more mobile numbers associated with the first server 104. The PPS 103 receives the first dataset 250, comprising hashes of a plurality of mobile numbers 252, including hashes of the first plurality of mobile numbers of the users of interest 110 and hashes of the second plurality of mobile numbers and the second dataset 260 comprising verification values 262 and security flags 264 associated with the hashed mobile numbers 252. The PPS 103 processes message pattern, one or more CTAs and sender identifier of one or more text messages directed to the hashed mobile numbers 252 in the first dataset 250 and may detect one or more phishing text messages 113.

At step 404, the PPS 103 may generate CDRs for the one or more phishing text messages 113. The CDR may comprise, but not limited to, a sender mobile number, a recipient mobile number, a timestamp of the message, a telecom operator associated with the sender, a telecom operator associated with the recipient and a text content of the phishing text message 113.

At step 406, the PPS 103 may transmit the generated CDR of each of the one or more phishing text messages 113 to the second server 106. The PPS 103 may encrypt the CDR of each of the one or more phishing text messages 113, using a public key of the second server 106 and may transmit the generated CDR of each of the one or more phishing text messages 113 to the second server 106.

At step 408, the PPS 103 may obtain tokens 216 for the CDRs of the phishing text messages 113 from the second server 106. The PPS 103 may transmit the encrypted data to the second server 106 and receive an acknowledgement token 216 for each of the one or more phishing text messages 113 from the second server 106. The acknowledgement token (alternatively referred herein as a CDR access token) is used to access the CDR of each of the one or more phishing text messages 113 from the second server 106.

At step 410, the PPS 103 may transmit a hash of the CDR access token 216, which may also be referred herein as hashed token, and a text of each of the one or more phishing text messages 113 to the first server 104 for investigation.

At step 412, the PPS 103 may receive a request to access the CDR associated with a number of selected one or more phishing text messages 113, that are selected by the first server 104 upon investigation. The request comprises the hashed tokens for each of the selected one or more phishing text messages 113.

At step 414, the PPS 103 may transmit the CDR access tokens 216 for the selected one or more phishing text messages 113 to the first server 104. The PPS 103 transmits one or more hashed mobile numbers, stored in user data 312, associated with the selected one or more phishing text messages 113 to the first server 104 for verification of the request. The PPS 103 receives at least a verification value 262 and a security flag 264 associated with a few hashed mobile numbers that belong to the users of interest. users of interest The PPS 103 verifies if the received verification values 262 and the security flags 264 match with any of the verification values 262 and the security flags 264 stored in the verification data 214. The PPS 103 may transmit the CDR access token 216 for each of the one or more phishing text messages 113 corresponding to the few hashed mobile umbers to the first server 104 upon successful verification of the request.

Figure 5:
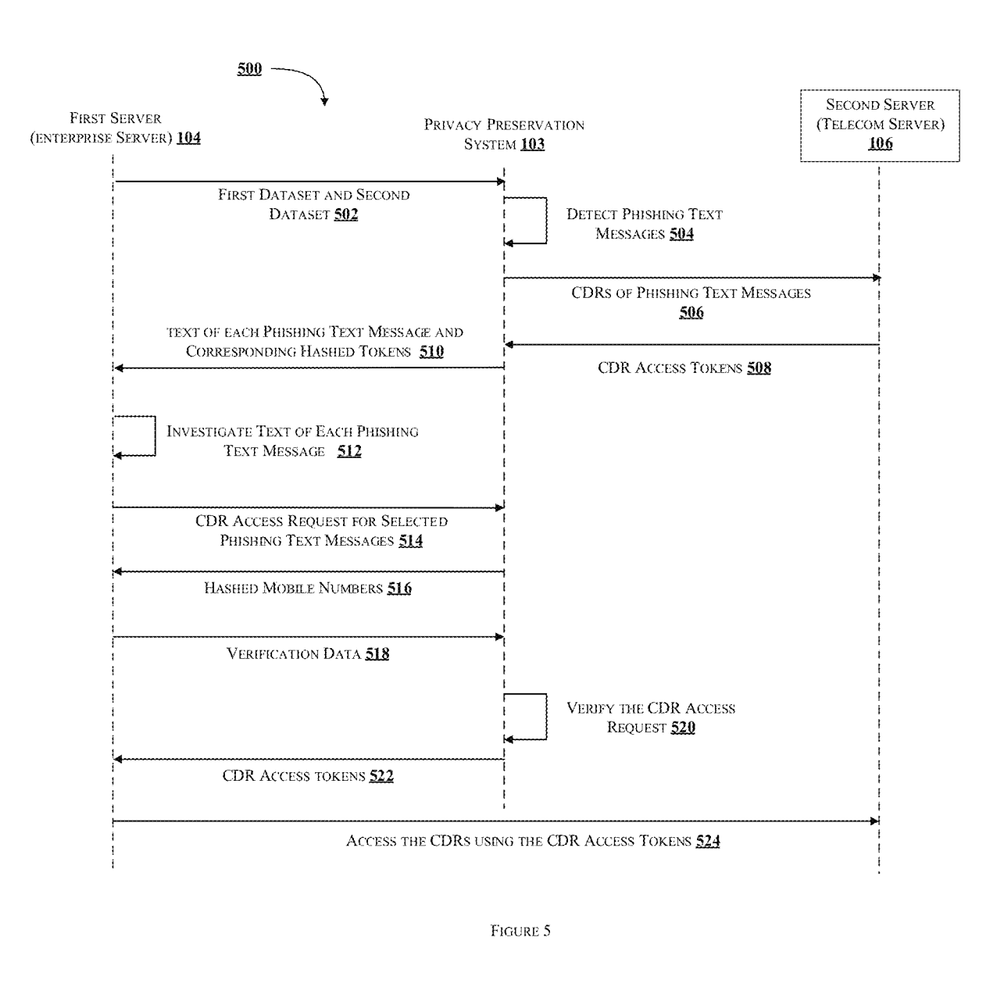
FIG. 5 illustrates a privacy preservation protocol illustrating steps involved in the method of securing access to user data during detection of phishing attacks in Short Message Service (SMS) communications between the first server, the PPS and a second server in accordance with an embodiment of the present disclosure.

FIG. 5 illustrates a privacy preservation protocol illustrating steps involved in the method of securing access to user data during detection of phishing attacks in Short Message Service (SMS) communications between the first server 104, the PPS 103 and the second server 106 in accordance with an embodiment of the present disclosure.

The method 500 may be described in the general context of computers executable instructions. Generally, computer executable instructions can include routines, programs, objects, components, data structures, procedures, modules, and functions, which perform specific functions or implement specific abstract data types.

The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 502, the first server 104 transmits user data 212 associated with a plurality of users to the PPS 103 to detect phishing attacks directed to the plurality of users. The user data 212 may include data of the users of interest 110, for whom the enterprise 105 provides security from phishing. The user data 212 may comprise a first dataset 250 comprising a plurality of hashed mobile numbers associated with a first plurality of mobile numbers of the users of interest 110 and the second plurality of mobile numbers. The user data 212 may also comprise a second dataset 260 including verification values 262 and security flags 264 associated with the hashed mobile numbers. The PPS 103 receives the user data 212 from the first server 104 and decrypts a plurality of mobile numbers 213 from the user data 212 to detect phishing attacks on the plurality of mobile numbers 213.

At step 504, the PPS 103 monitors one or more text messages directed to the plurality of mobile numbers 213 to detect any phishing attacks. The PPS 103 processes a message pattern, one or more CTAs and a sender identifier of one or more text messages directed to the plurality of hashed mobile numbers for detecting one or more phishing text messages 113 based on the processing.

At step 506, the PPS 103 may receive CDRs of the one or more phishing text messages 113 generated by the cellular gateway 102 and transmit CDRs of the one or more phishing text messages 113 to the second server 106. The CDR of a text message may comprise information about a sender including a sender identifier such as a sender mobile number or a sender header, a time at which the text message was sent, a location of the sender, a base station associated with the sender, a recipient identifier such as a recipient's mobile number, a base station associated with the recipient and a location of the recipient, a time at which the text message was received at the cellular gateway 102. The PPS 103 may encrypt a hash of the recipient's mobile number, and the CDR of each of the one or more phishing text messages 113, using a public key of the second server 106. The PPS 103 may transmit the encrypted data to the second server 106 to obtain CDR access tokens for the CDRs of the one or more phishing text messages 113. Further, the second server 106 may receive the encrypted data from the second server 106.

At step 508, the second server 106 may generate an acknowledgement token 216 acknowledging receipt and storage of the CDR for each of the one or more phishing text messages 113. The second server 106 may transmit the acknowledgement tokens 216, also referred as the CDR access tokens to the PPS 103. The PPS 103 may receive the CDR access tokens 216, for each of the one or more phishing text messages 113 from the second server 106.

At step 510, the PPS 103 may generate hashes of the CDR access tokens 216 and may transmit the hashes of the CDR access tokens 216, which may also be referred herein as hashed tokens to the first server 104. The PPS 103 may also transmit a text of each of the one or more phishing text messages 113 to the first server 104 for investigation. At this stage, the PPS 103 may not transmit information about sender or recipient or any other details of the phishing text messages to the first server 104. Further, the first server 104 may receive the hashed tokens and the text of the one or more phishing text messages 113 for investigation.

At step 512, the first server 104 may investigate text of each of the one or more phishing text messages 113 and may select one or more phishing text messages 113 for accessing CDRs. The first server 104 may investigate the textual information of the one or more phishing text messages 113 and may select one or more phishing text messages 113 for which the first server 104 may require access to CDR. The investigation may comprise processing the textual information and determining if the textual information impersonates the enterprise 105 in phishing attack.

At step 514, the first server 104 transmit a request, also referred herein as a CDR access request, to the PPS 103 to access CDRs of the selected one or more phishing text messages. The CDR access request may comprise the hashed tokens for each of the selected one or more phishing text messages 113. The PPS 103 may receive the CDR access request from the first server 104 to access the CDRs associated with the selected one or more phishing text messages 113.

At step 516, the PPS 103 may, in response to receiving the CDR access request, transmit one or more hashed mobile numbers 252, stored in user data 312, associated with the selected one or more phishing text messages 113 to the first server 104 to receive verification data from the first server 104 for verification of the CDR access request. The first server 104 may receive the one or more hashed mobile numbers 252 associated with the selected one or more phishing text messages 113 from the PPS 103.

At step 518, the first server 104 may transmit verification data comprising verification values 262 and security flags 264 corresponding to the received one or more hashed mobile numbers 252 to the PPS 103. In some embodiments, the first server 104 may identify one or more mobile numbers, of the received one or more hashed mobile numbers 252, associated only with the users of interest 110 and may transmit verifications values 262 and security flags 264 corresponding to mobile numbers of only the users of interest 110. Further, the PPS 103 may receive the verification values 262 and security flags 264 associated with the one or more hashed mobile numbers 252.

At step 520, the PPS 103 may verify the CDR access request received from the first server 104. The PPS 103 may verify if the received verification values 262 and the security flags 264 match with any of the verification values 262 and the security flags 264 stored in the verification data 214.

At step 522, the PPS 103 may transmit the CDR access tokens 216 for the one or more phishing text messages 113 to the first server 104 upon successful verification of the CDR access request. The PPS 103 may identify one or more phishing text messages that have been successfully verified, determine corresponding CDR access tokens 216 and may transmit the CDR access tokens 216 to the first server 104.

At step 524, the first server 104 may access the CDRs from the second server 106 using the CDR access tokens 216. The first server 104 may further communicate with the second server 106 directly to prevent any phishing attacks impersonating the enterprise 104 and also prevent any phishing attacks on the users of interest 110.

Thus, the first server 104 may communicate with the PPS 103 and secure mobile numbers of the users associated with the enterprise 105 by sharing only hashed mobile numbers and at the same time secure them from phishing attacks. Further, as the first server 104 transmits hashed mobile numbers of one or more users 110 as well as non-users, the privacy of the user data is preserved at the PPS 103 as the PPS 103 is completely unaware of mobile numbers of the one or more users 110 of the enterprise 105 and mobile numbers associated with the users who are not associated with the enterprise 105. The PPS 103 detects phishing text messages 113 and securely transmits the CDR access tokens 216 to the first server 104 upon successful verification of the CDR access request. Thus, the PPS 103 ensures that the CDR access tokens 216 are transmitted to the correct server to avoid any hacking attacks while transmitting information. Also, the PPS 103, in communication with the second server 106, stores the phishing text messages 113 in the second server 106 and creates the CDR access tokens 216 to access the CDRs from the second server 106.

Figure 6:
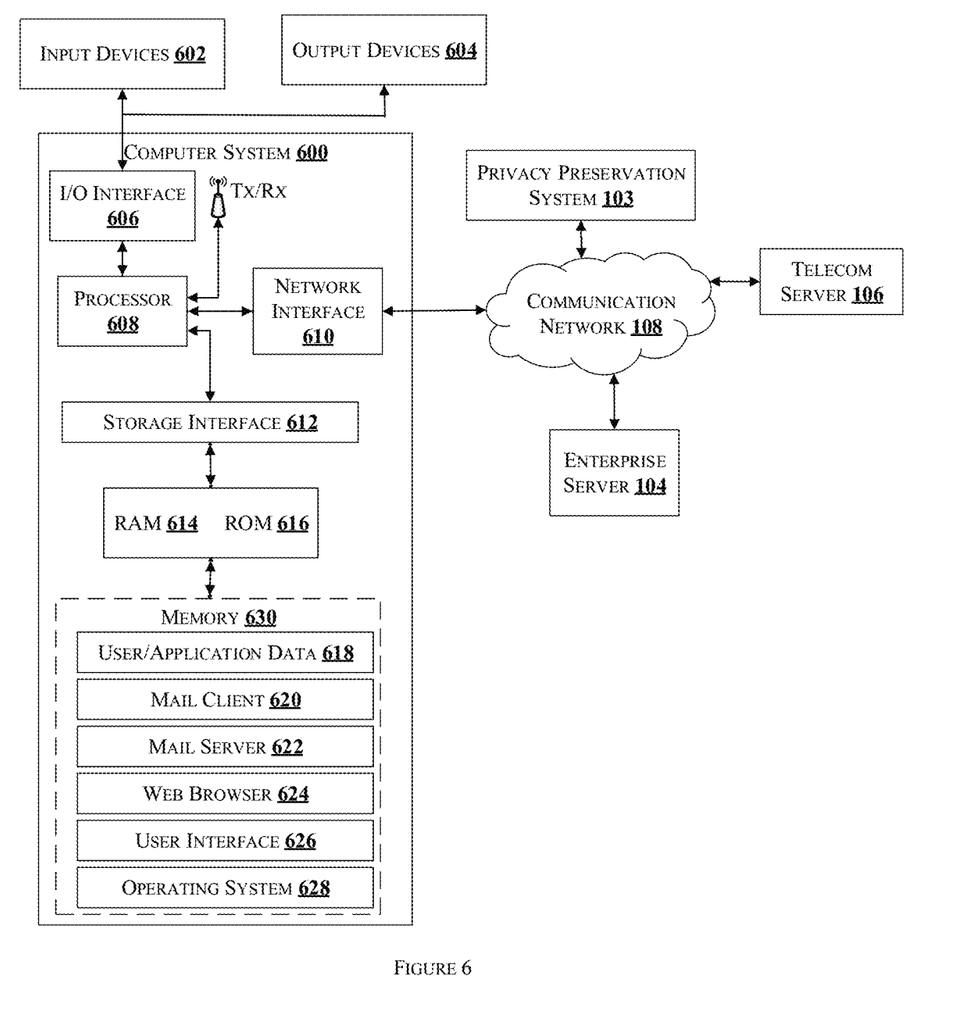
FIG. 6 illustrates a block diagram of an exemplary computer system for implementing embodiments consistent with the present disclosure.

FIG. 6 illustrates a block diagram of an exemplary computer system for implementing embodiments consistent with the present disclosure.

In an embodiment, the computer system 600 may be privacy preservation system 102, used for securing access to user data during detection of phishing attacks in Short Message Service (SMS) communications. The computer system 600 may include a central processing unit ("CPU" or "processor") 608. The processor 608 may comprise at least one data processor for executing program components for executing user or system-generated business processes. The processor 608 may include specialized processing units such as integrated system (bus) controllers, memory management control units, floating point units, graphics processing units, digital signal processing units, etc.

The processor 608 may be disposed in communication with one or more input/output (I/O) devices 602 and 604 via I/O interface 606. The I/O interface 606 may employ communication protocols/methods such as, without limitation, audio, analog, digital, stereo, IEEE-1694, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 606, the computer system 600 may communicate with one or more I/O devices 602 and 604. In some implementations, the processor 608 may be disposed in communication with the communication network 108 via a network interface 610. The network interface 610 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 610 and the communication network 108, the computer system 600 may be connected to the PPS 103, the first server 104, and the second server 106.

The communication network 108 can be implemented as one of the several types of networks, such as intranet or any such wireless network interfaces. The communication network 108 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 108 may include a variety of network devices, including routers, bridges, servers, computing devices, storage devices, etc.

In some embodiments, the processor 608 may be disposed in communication with a memory 630 e.g., RAM 614, and ROM 616, etc. as shown in FIG. 6, via a storage interface 612. The storage interface 612 may connect to memory 630 including, without limitation, memory drives, removable disc drives, etc., employing connection protocols such as Serial Advanced Technology Attachment (SATA), Integrated Drive Electronics (IDE), IEEE-1694, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 630 may store a collection of program or database components, including, without limitation, user/application 618, an operating system 628, a web browser 624, a mail client 620, a mail server 622, a user interface 626, and the like. In some embodiments, computer system 600 may store user/application data 618, such as the data, variables, records, etc. as described in this invention. Such databases may be implemented as fault-tolerant, relational, scalable, secure databases such as Oracle or Sybase.

The operating system 628 may facilitate resource management and operation of the computer system 600. Examples of operating systems include, without limitation, Apple Macintosh™ OS X™, UNIX™, Unix-like system distributions (e.g., Berkeley Software Distribution (BSD), FreeBSD™, Net BSD™, Open BSD™, etc.), Linux distributions (e.g., Red Hat™, Ubuntu™, K-Ubuntu™, etc.), International Business Machines (IBM™) OS/2™, Microsoft Windows™ (XP™ Vista/7/8, etc.), Apple iOS™, Google Android™, Blackberry™ Operating System (OS), or the like. A user interface may facilitate display, execution, interaction, manipulation, or operation of program components through textual or graphical facilities. For example, user interfaces may provide computer interaction interface elements on a display system operatively connected to the computer system 600, such as cursors, icons, check boxes, menus, windows, widgets, etc. Graphical User Interfaces (GUIs) may be employed, including, without limitation, Apple™ Macintosh™ operating systems' Aqua™, IBM™ OS/2™, Microsoft™ Windows™ (e.g., Aero, Metro, etc.), Unix X-Windows™, web interface libraries (e.g., ActiveX, Java, JavaScript, AJAX, HTML, Adobe Flash, etc.), or the like.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. Accordingly, the disclosure of the embodiments of the disclosure is intended to be illustrative, but not limiting, of the scope of the disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

| Referral Numerals: | |
|---|---|
| Reference Number | Description |
| 100 | System Architecture |
| 102 | Cellular Gateway |
| 103 | Privacy Preservation System (PPS) |
| 104 | Enterprise Server |
| 105 | Enterprise |
| 106 | Telecommunication Server |
| 108 | Communication Server |
| 110 | Users |
| 112 | Communication Network |
| 113 | Phishing Text Messages |
| 114 | Phishing attackers |
| 202 | Processor Of PPS |
| 204 | Memory of PPS |
| 206 | Privacy Preservation Module |
| 208 | Phishing detection module |
| 210 | Token provisioning module |
| 212 | User data |
| 214 | Verification data |
| 216 | CDR access tokens |
| 252 | Hashed mobile numbers |
| 262 | Verification values |
| 264 | Security flags |
| 302 | Processor of Enterprise server |
| 304 | Memory of Enterprise server |
| 306 | Data privacy module |
| 308 | Investigation module 308 |
| 310 | CDR access module |
| 312 | User data |
| 314 | Authentication data |
| 316 | CDR access tokens |
| 352 | Mobile numbers |
| 354 | Random secret values |
| 600 | Computer system |
| 602 | Input devices |
| 604 | Output devices |
| 606 | Input/Output interface of the computer |
| 608 | Processor of the computer system |
| 610 | Network interface |
| 612 | Storage interface |
| 614 | RAM |
| 616 | ROM |
| 618 | User/Application data |
| 620 | Mail client |
| 622 | Mail server |
| 624 | Web browser |
| 626 | User interface |
| 628 | Operating system |
| 630 | Memory of the computer |

I claim:

1. A method for securing access to user data during detection of phishing attacks in Short Message Service (SMS) communications, the method comprising:
   detecting, by a privacy preservation system, one or more phishing text messages directed to one or more hashed mobile numbers associated with a first server;
   transmitting, by the privacy preservation system, a Call Data Record (CDR) of each of the one or more phishing text messages to a second server;
   obtaining, by the privacy preservation system, an access token for the CDR of each of the one or more phishing text messages from the second server;
   transmitting, by the privacy preservation system, text and a hashed token of CDR of each of the one or more phishing text messages to the first server for investigation of the text;
   receiving, by the privacy preservation system, a request to access the CDR associated with each of a selected one or more phishing text messages from the first server, wherein the request comprises the hashed tokens of the selected one or more phishing text messages; and
   transmitting, by the privacy preservation system, the access token of the CDR of each of the selected one or more phishing text messages to the first server to access the CDR of each of the selected one or more phishing text messages, upon successful verification of the request.

2. The method as claimed in claim 1, wherein detecting the one or more phishing text messages directed to the one or more hashed mobile numbers further comprises:
   receiving one or more text messages directed to one or more hashed mobile numbers, wherein the one or more hashed mobile numbers comprises hashed values of a first plurality of mobile numbers to be secured and a second plurality of mobile numbers not to be secured;
   processing one or more of a message pattern, a Call to Action (CTA) information and a sender reputation information extracted from each of the one or more text messages; and
   determining that one or more text messages as phishing text messages based on the processing.

3. The method as claimed in claim 1, wherein transmitting the text of the one or more phishing text messages and corresponding hashed tokens further comprising:
   generating the CDR of each of the one or more phishing text messages; and
   generating hashed tokens corresponding to the access tokens by hashing the access token of the CDR of each of the one or more phishing text messages.

4. The method as claimed in claim 1, wherein the selected one or more phishing text messages are a set of phishing text messages selected by the first server based on the investigation of the text of each of the one or more phishing text messages.

5. The method as claimed in claim 1, wherein the request to access the CDRs is verified by:
   transmitting a hashed mobile number associated with each of the selected one or more phishing text messages to the first server;
   receiving, from the first server, a verification value and a security flag associated with the hashed mobile number of each of the selected one or more phishing text messages, wherein the security flag indicates whether a mobile number, associated with the hashed mobile number, requires security from phishing;
   verifying whether the received verification value and the security flag associated with the hashed mobile number matches with prestored verification data, wherein the prestored verification data comprises a plurality of verification values and corresponding security flags; and
   determining that the request is successfully verified when the verification value and the security flag matches with the prestored verification data.

6. A privacy preservation system for securing access to user data during detection of phishing attacks in Short Message Service (SMS) communications, the privacy preservation system comprising:
   a memory;
   a processor communicatively coupled with the memory, the processor is configured to:

detect one or more phishing text messages directed to one or more hashed mobile numbers associated with a first server;

transmit a Call Data Record (CDR) of each of the one or more phishing text messages to a second server;

obtain an access token for the CDR of each of the one or more phishing text messages from the second server;

transmit text and a hashed token of CDR of each of the one or more phishing text messages to the first server for investigation of the text;

receive a request to access the CDR associated with each of a selected one or more phishing text messages from the first server, wherein the request comprises the hashed tokens of the selected one or more phishing text messages; and transmit the access token of the CDR of each of the selected one or more phishing text messages to the first server to access the CDR of each of the selected one or more phishing text messages, upon successful verification of the request.

7. The privacy preservation system as claimed in claim 6, wherein to detect the one or more phishing text messages directed to the one or more hashed mobile numbers, the processor is further configured to:

receive one or more text messages directed to one or more hashed mobile numbers, wherein the one or more hashed mobile numbers comprises hashed values of a first plurality of mobile numbers to be secured and a second plurality of mobile numbers not to be secured;

process one or more of a message pattern, a Call to Action (CTA) information and a sender reputation information extracted from each of the one or more text messages; and determine that one or more text messages as phishing text messages based on the processing.

8. The privacy preservation system as claimed in claim 6, wherein to transmit the text of the one or more phishing text messages and corresponding hashed tokens, the processor is further configured to:

generate the CDR of each of the one or more phishing text messages; and generate hashed tokens corresponding to the access tokens by hashing the access token of the CDR of each of the one or more phishing text messages.

9. The privacy preservation system as claimed in claim 6, wherein the first server is configured to select a set of phishing text messages based on the investigation of the text of each of the one or more phishing text messages as the selected one or more phishing text messages.

10. The privacy preservation system as claimed in claim 6, wherein the processor is configured to verify the request to access the CDRs by:

transmitting a hashed mobile number associated with each of the selected one or more phishing text messages to the first server;

receiving, from the first server, a verification value and a security flag associated with the hashed mobile number of each of the selected one or more phishing text messages, wherein the security flag indicates whether a mobile number, associated with the hashed mobile number, requires security from phishing;

verifying if the received verification value and the security flag associated with the hashed mobile number matches with prestored verification data, wherein the prestored verification data comprises a plurality of verification values and corresponding security flags; and determining that the request is successfully verified when the verification value and the security flag matches with the prestored verification data.

11. A non-transitory computer-readable medium having program instructions stored thereon, when executed by a privacy preservation system, facilitate the privacy preservation system to secure access to user data during detection of phishing attacks in Short Message Service (SMS) communications by operations comprising:

detecting one or more phishing text messages directed to one or more hashed mobile numbers associated with a first server;

transmitting a Call Data Record (CDR) of each of the one or more phishing text messages to a second server;

obtaining an access token for the CDR of each of the one or more phishing text messages from the second server;

transmitting text and a hashed token of CDR of each of the one or more phishing text messages to the first server for investigation of the text;

receiving a request to access the CDR associated with each of a selected one or more phishing text messages from the first server, wherein the request comprises the hashed tokens of the selected one or more phishing text messages; and transmitting the access token of the CDR of each of the selected one or more phishing text messages to the first server to access the CDR of each of the selected one or more phishing text messages, upon successful verification of the request.

12. The non-transitory computer-readable medium as claimed in claim 11, wherein the program instructions configured to detect the one or more phishing text messages directed to the one or more hashed mobile numbers further facilitate:

receiving one or more text messages directed to one or more hashed mobile numbers, wherein the one or more hashed mobile numbers comprises hashed values of a first plurality of mobile numbers to be secured and a second plurality of mobile numbers not to be secured;

processing one or more of a message pattern, a Call to Action (CTA) information and a sender reputation information extracted from each of the one or more text messages; and determining that one or more text messages as phishing text messages based on the processing.

13. The non-transitory computer-readable medium as claimed in claim 11, wherein the program instructions configured to transmit the text of the one or more phishing text messages and corresponding hashed tokens further facilitate:

generating the CDR of each of the one or more phishing text messages; and generating hashed tokens corresponding to the access tokens by hashing the access token of the CDR of each of the one or more phishing text messages.

14. The non-transitory computer-readable medium as claimed in claim 11, wherein the selected one or more phishing text messages are a set of phishing text messages selected by the first server based on the investigation of the text of each of the one or more phishing text messages.

15. The non-transitory computer-readable medium as claimed in claim 11, wherein program instructions configured to verify the request to access the CDRs further facilitate:

transmitting a hashed mobile number associated with each of the selected one or more phishing text messages to the first server;

receiving, from the first server, a verification value and a security flag associated with the hashed mobile number of each of the selected one or more phishing text messages, wherein the security flag indicates whether a mobile number, associated with the hashed mobile number, requires security from phishing;

verifying whether the received verification value and the security flag associated with the hashed mobile number matches with prestored verification data, wherein the prestored verification data comprises a plurality of verification values and corresponding security flags; and determining that the request is successfully verified when the verification value and the security flag matches with the prestored verification data.

\* \* \* \* \*